United States Patent
Rothschild

(10) Patent No.: US 9,831,817 B2
(45) Date of Patent: Nov. 28, 2017

(54) SOLAR PANEL MOUNTING BASE AND SYSTEM FOR SOLAR PANEL INSTALLATION

(71) Applicant: Elie Rothschild, San Francisco, CA (US)

(72) Inventor: Elie Rothschild, San Francisco, CA (US)

(*) Notice: Subject to any disclaimer, the term of this patent is extended or adjusted under 35 U.S.C. 154(b) by 81 days.

(21) Appl. No.: 14/737,134

(22) Filed: Jun. 11, 2015

(65) Prior Publication Data
US 2015/0280637 A1 Oct. 1, 2015

Related U.S. Application Data

(63) Continuation-in-part of application No. 13/471,050, filed on May 14, 2012, now Pat. No. 9,057,544,
(Continued)

(51) Int. Cl.
*H02S 20/24* (2014.01)
*F24J 2/52* (2006.01)
(Continued)

(52) U.S. Cl.
CPC .............. *H02S 20/24* (2014.12); *F16B 2/065* (2013.01); *F16B 5/02* (2013.01); *F24J 2/5237* (2013.01); *F24J 2/5239* (2013.01); *F24J 2/5256* (2013.01); *F24J 2/5264* (2013.01); *H02S 20/00* (2013.01); *F24J 2/4638* (2013.01); *F24J 2002/0038* (2013.01); *F24J 2002/4672* (2013.01);
(Continued)

(58) Field of Classification Search
CPC .... F16B 5/02; F24J 2/5264; F24J 2002/5279; F24J 2/5256; F24J 2/5237; F24J 2/5239; F24J 2002/4672; H02S 20/24
See application file for complete search history.

(56) References Cited

U.S. PATENT DOCUMENTS 6,105,316 A * 8/2000 Bottger ................. F24J 2/5237
126/623
8,371,076 B2 * 2/2013 Jones ..................... F24J 2/5237
126/704
(Continued)

FOREIGN PATENT DOCUMENTS

WO WO2013059370 * 4/2013 ............. H02S 20/24

Primary Examiner — Michael Safavi
(74) Attorney, Agent, or Firm — Mark David Torche; Patwrite LLC

(57) ABSTRACT

A solar panel mounting base and system for solar panel installation uses a mounting base that is injection molded to include different connection locations which provide flexibility when installing solar panels to the mounting bases. Attachment clamps are secured to the mounting base using carriage bolts which are secured to the mounting base in an attachment well and allow the installer to attach solar panels from the top which makes installation easy and fast. The attachment clamps have a horizontal and vertical portion that use grooves to adjustably secure the two together when in the desired location. Ballast blocks are used to provide a non-invasive installation. In an array, multiple bases are used to provide the structure to support the solar array. Installers may vary the angle the solar panels form 5 degrees to 10 degrees by selecting the appropriate connection location.

8 Claims, 8 Drawing Sheets

Related U.S. Application Data which is a continuation-in-part of application No. 12/710,328, filed on Feb. 22, 2010, now Pat. No. 8,567,132.

(51) Int. Cl.
| | | |
|---|---|---|
| *F16B 2/06* | (2006.01) | |
| *F16B 5/02* | (2006.01) | |
| *H02S 20/00* | (2014.01) | |
| *F24J 2/46* | (2006.01) | |
| *F24J 2/00* | (2014.01) | |

(52) U.S. Cl.
CPC ........ *F24J 2002/5279* (2013.01); *Y02B 10/12* (2013.01); *Y02E 10/47* (2013.01); *Y02E 10/50* (2013.01)

(56) References Cited

U.S. PATENT DOCUMENTS

| | | | | |
|---|---|---|---|---|
| 8,418,419 | B1* | 4/2013 | Aseere | F24J 2/5205 136/251 |
| 8,733,036 | B2* | 5/2014 | Salam | F24J 2/4638 136/251 |
| 8,869,471 | B2* | 10/2014 | Wildes | H01L 31/0422 52/173.3 |
| 8,875,453 | B2* | 11/2014 | Kanczuzewski | F16M 13/02 136/244 |
| 9,194,611 | B2* | 11/2015 | Khowaiter | F24J 2/5245 |
| 9,196,755 | B2* | 11/2015 | Wildes | H02S 20/00 |
| 9,249,925 | B2* | 2/2016 | Roensch | H01L 31/042 |
| 9,413,285 | B2* | 8/2016 | Wildes | H02S 20/00 |
| 2009/0266406 | A1* | 10/2009 | Duke | F24J 2/5237 136/251 |
| 2011/0068244 | A1 | 3/2011 | Hartelius et al. | |
| 2011/0108083 | A1* | 5/2011 | Ravestein | F24J 2/5237 136/244 |
| 2011/0271611 | A1* | 11/2011 | Maracci | F24J 2/5245 52/173.3 |
| 2011/0303807 | A1* | 12/2011 | Van Walraven | E04D 11/005 248/205.1 |
| 2012/0031469 | A1* | 2/2012 | Loois | F24J 2/465 136/251 |
| 2012/0073220 | A1 | 2/2012 | Kobayashi et al. | |
| 2012/0061337 | A1 | 3/2012 | Seery et al. | |
| 2012/0187267 | A1* | 7/2012 | Hudson | F24J 2/5247 248/292.14 |
| 2012/0199180 | A1* | 8/2012 | Salam | F24J 2/4638 136/251 |
| 2012/0223032 | A1* | 9/2012 | Rothschild | F24J 2/5237 211/41.1 |
| 2012/0255244 | A1* | 10/2012 | Hendrickson | H01L 35/30 52/173.3 |
| 2012/0266944 | A1* | 10/2012 | Wildes | F24J 2/5237 136/251 |
| 2013/0119211 | A1* | 5/2013 | Franklin | F24J 2/5233 248/176.3 |
| 2013/0220403 | A1* | 8/2013 | Rizzo | F16B 7/0446 136/251 |
| 2014/0291463 | A1* | 10/2014 | Kanczuzewski | F16M 13/02 248/237 |
| 2014/0299178 | A1* | 10/2014 | Devlin | F24J 2/4638 136/251 |
| 2015/0102194 | A1* | 4/2015 | Liu | F24J 2/5258 248/316.1 |

\* cited by examiner

SOLAR PANEL MOUNTING BASE AND SYSTEM FOR SOLAR PANEL INSTALLATION

CROSS REFERENCE TO RELATED APPLICATIONS

This application is a continuation-in-part of U.S. patent application Ser. No. 13/471,050, filed May 14, 2012, which is a continuation-in-part of U.S. patent application Ser. No. 12/710,328 filed Feb. 22, 2010 now U.S. Pat. No. 8,567,132 issued Oct. 29, 2013, which in turn claims priority to Provisional Application 61/157,002, filed on Feb. 20, 2009, which are all incorporated herein by reference.

BACKGROUND OF THE INVENTION

As alternative energy sources become more important to the economic and environmental well-being of society, solar energy use will continue to increase. It is becoming more common to see roofs and other structures having solar panels installed to generate electrical energy. In general, these installations require significant rack systems that may be permanent. These kinds of installations can cause exposure problems to the building due to the required structural penetration to secure the solar panels. Additionally, it is difficult to remove if desired.

To solve this problem, some solar systems utilize racking systems that use ballast to secure them rather than permanent installations. Although this helps in removal and minimizing surface penetrations, it is difficult for such installations to meet strength, reliability, environmental and safety standards while also withstanding wind, rain, temperature variations and solar radiation. Additionally, these racking systems tend to be bulky and complex requiring expert installation done on-site.

Often when installing solar panels, the angle at which the panels need to be placed is different depending on the installation and the location of the installation. While many solutions to this problem have been proposed, most involve complicated adjustment components or compromising the best angle for ease in construction. There is a need for a solar racking system that is quick and easy to install and that allows the user to select an angle best suited for the application. It is also desirable to be able to mount the solar panels even where permanent connection to the structure is not desired or practical.

SUMMARY OF THE INVENTION

A solar panel mounting base and system for solar panel installation uses a mounting base that is injection molded to include different connection locations which provide flexibility when installing solar panels to the mounting bases. Attachment clamps are secured to the mounting base using carriage bolts which are secured to the mounting base in an attachment well and allow the installer to attach solar panels from the top which makes installation easy and fast. The attachment clamps have a horizontal and vertical portion that use grooves to adjustably secure the two together when in the desired location. Ballast blocks are used to provide a non-invasive installation. In an array, multiple bases are used to provide the structure to support the solar array. Installers may vary the angle the solar panels form 5 degrees to 10 degrees by selecting the appropriate connection location.

Other features and advantages of the instant invention will become apparent from the following description of the invention which refers to the accompanying drawings.

DETAILED DESCRIPTION OF THE INVENTION

Figure 1:
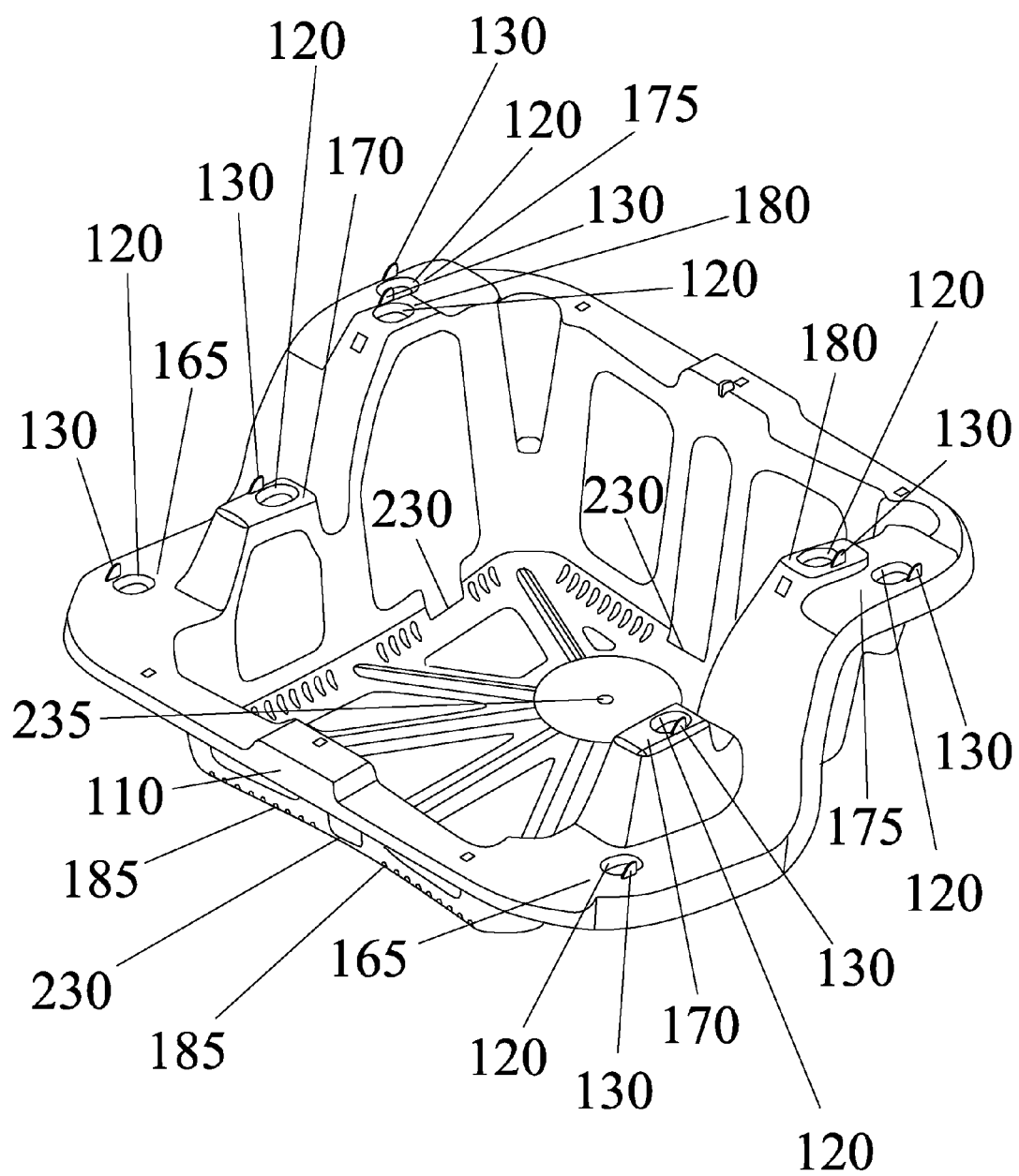
FIG. 1 is a perspective drawing of a solar panel mounting base according to an embodiment of the present invention.
Figure 2:
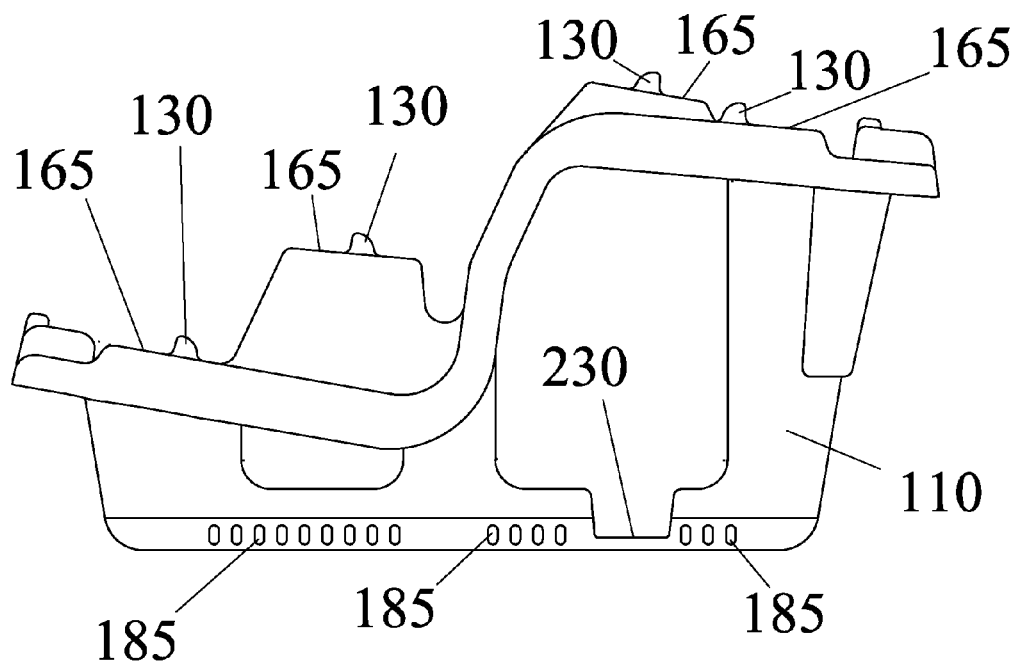
FIG. 2 is a side view of the solar panel mounting base shown in FIG. 1.
Figure 3:
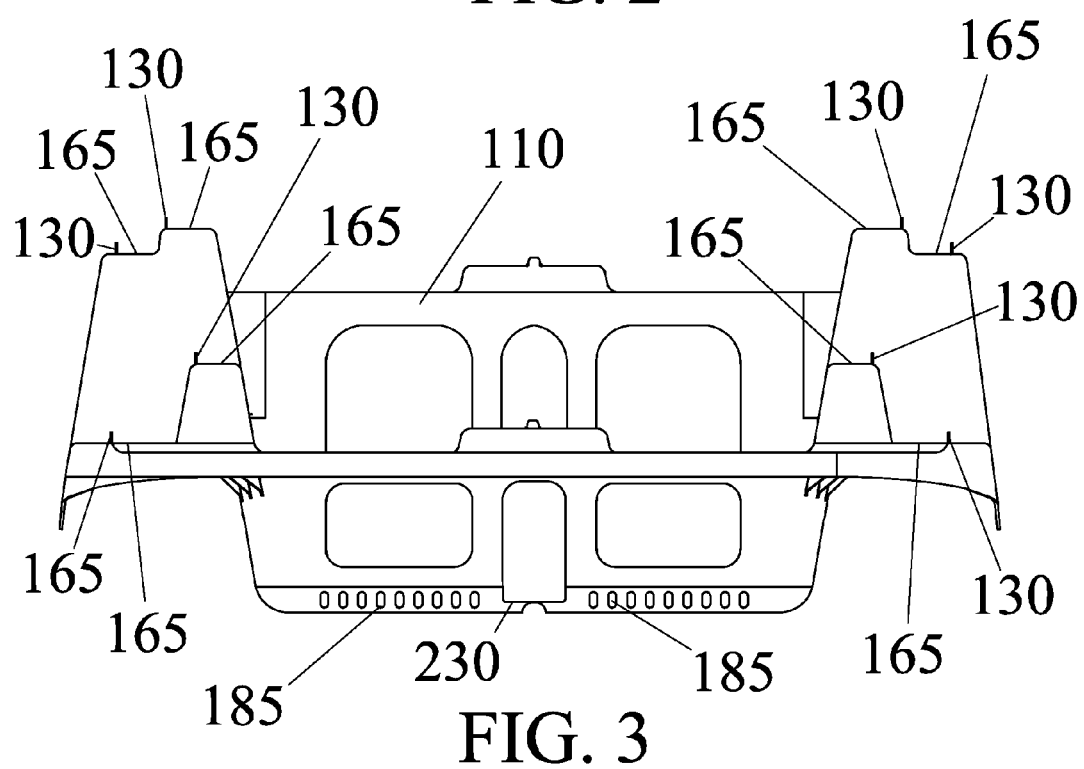
FIG. 3 is a front view of the solar panel mounting base shown in FIG. 1.
Figure 4:
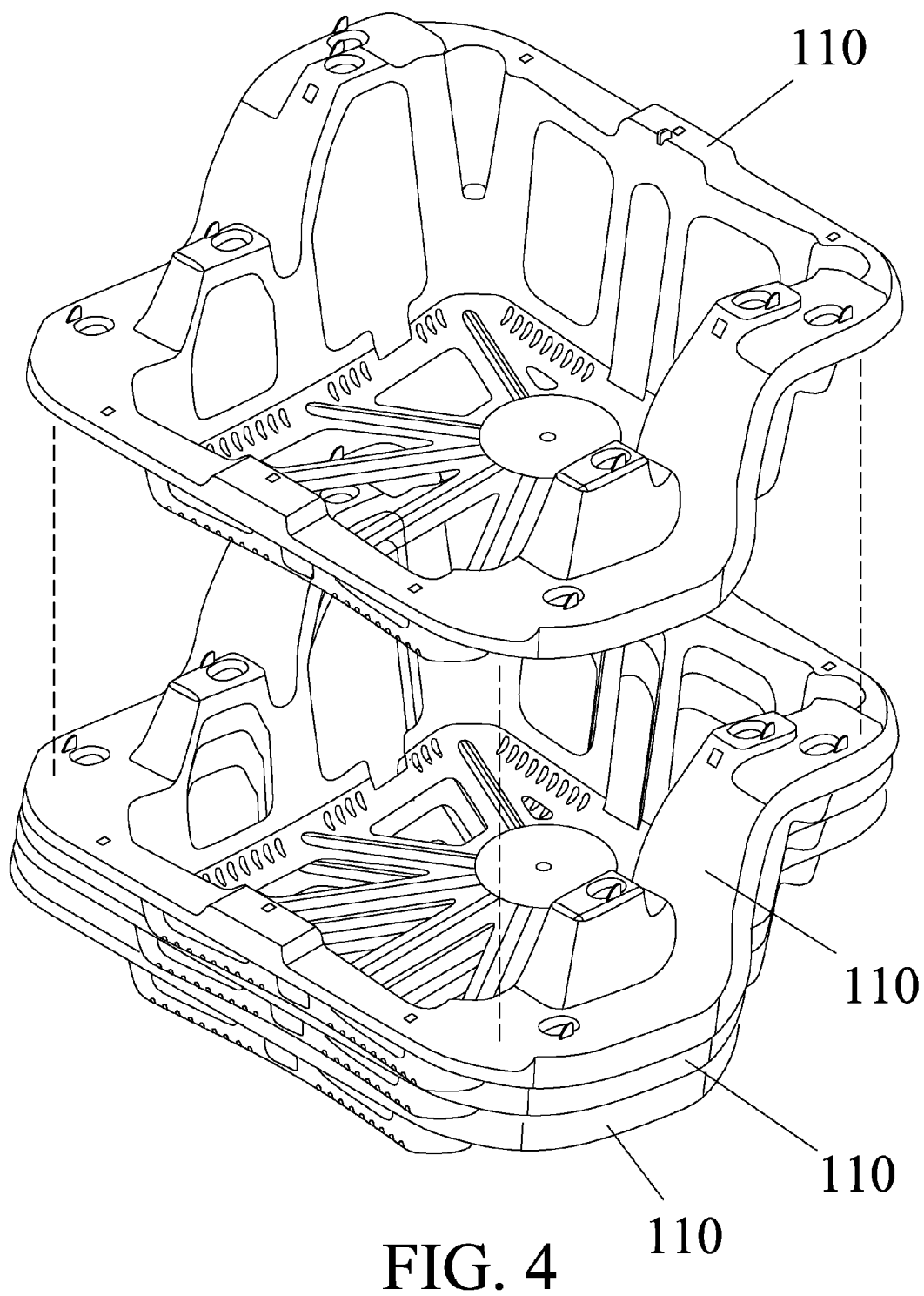
FIG. 4 is a perspective drawing showing a plurality of the solar panel mounting bases shown in FIG. 1 being stacked.
Figure 5:
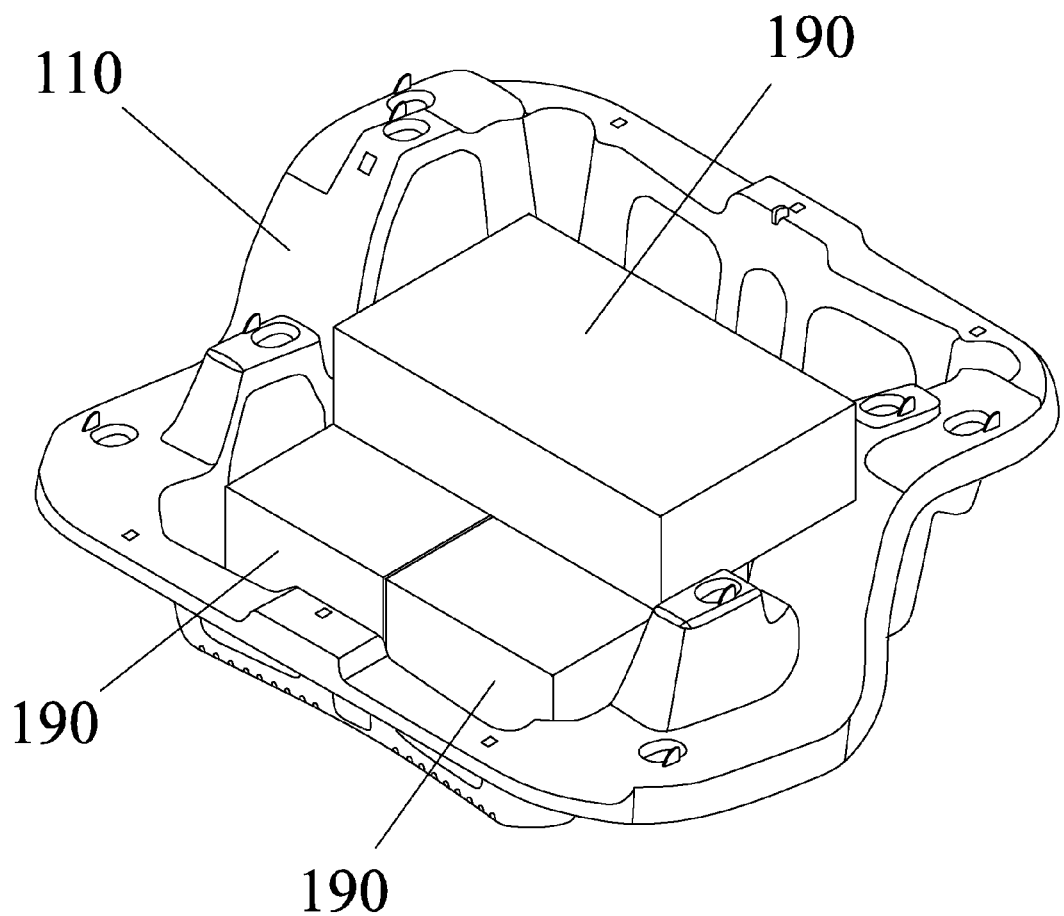
FIG. 5 is a perspective view of the solar panel mounting base shown in FIG. 1 with ballast installed.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to the figures, a solar panel mounting base and system for solar panel installation 100 is shown having a mounting base 110. Mounting base 110 is made of injection molded nylon such as BASF ULTRAMID glass-filled nylon. This material is extremely strong, stable and electrically insulating. Of course other suitable materials may be used to produce mounting base 110 as long as it can withstand the pressure of the solar panels and the exposure to the elements.

Mounting base 110 has four connection locations to allow an installer to mount a solar panel 195 at the desired angle. The first location 165 is the lowest with a second location 170 that is above the first. Two upper locations, 175 and 180 respectively, are located along an upper portion of mounting base 110 to provide flexibility in both mounting angles and spacing between solar panels 195. The connection locations are angled with respect to the horizontal to provide a stable and secure connecting location to secure solar panel 195 when solar panel 195 is secured between another mounting base 110 at a connection location that is at a different height than the first mounting base 110. Various kinds of solar panel installations may attached to these locations such as, but not limited to, struts, channels and frameless panels as is known in the art.

An alignment tab 130 is molded into mounting base 110 to align an attachment clamp 125 that is used to quickly and easily allow the installer to attach solar panels 195 to mounting base 110 without having to have access to an underside of solar panel 195. This allows the installer to complete the installation from the top down which greatly simplifies and saves installation time. Each alignment clamp fits over an attachment opening 120 which is molded into mounting base 110 in one of four connection locations 165, 170, 175 and 180.

A plurality of drainage channels 185 are located along the bottom portion of mounting base 110 to allow water to exit and not build up when exposed to the elements such as rain or snow. Mounting base 110 has openings along the sides to decrease the amount of material used and to allow air flow. A windscreen (not shown) may be attached to the leading edge of mounting base 110 to direct the flow of air up and around solar panels 195. Four hold down notches 230 are provided along a bottom portion of mounting base 110 that allow installation struts 240 to fit within.

Various methods of installing a solar panel array are provided using solar panel mounting base and system for solar panel installation 100. It is possible to attach mounting base 110 to a roof (not shown) using mechanical fasteners (not shown) that penetrate the structure as is known in the art. If a non-permanent installation or non-intrusive method of installation is desires, ballast blocks 190 are stacked within the bottom portion of mounting base 110.

Figure 7:
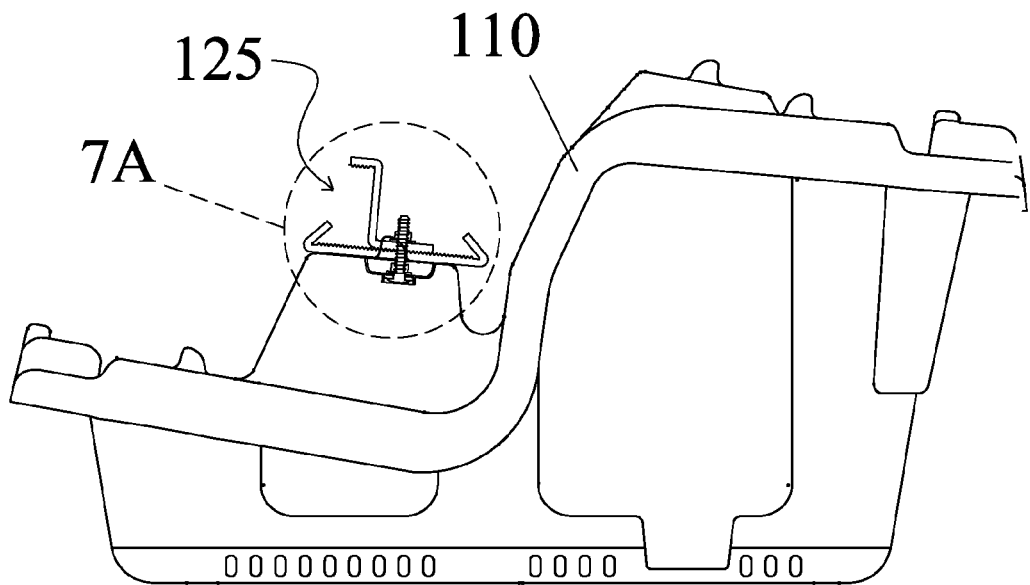
FIG. 7 is a side view of the solar panel mounting base shown in FIG. 1 with an attachment clip mounted thereon.

Referring to FIGS. 1-3 and 10, mounting bases 110 are installed using installation struts 240 that fit within hold down notches 230. Installation struts are used in installations that do not allow anchors to be located under each mounting base 110. An anchor 250 is attached to strut 240 and then attaches to other struts 240 to hold mounting bases 110 down. Installation strut 240 is attached to mounting base 110 using a carriage bolt (not shown) that fits within bottom attachment point 235 that includes a carriage bolt well (not shown) like the one shown in detail in FIG. 7. In this way mounting bases 110 are secured using mechanical fasteners even when the fasteners cannot be located beneath the bases.

Figure 7A:
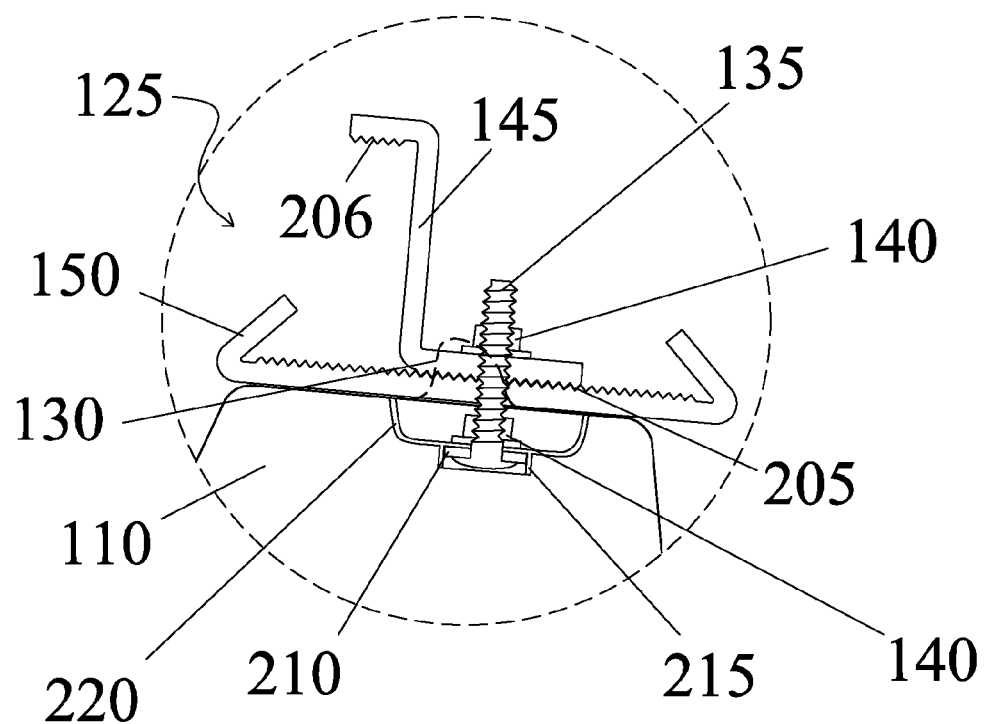
FIG. 7A is a detailed view of the attachment clip shown in FIG. 7.
Figure 8:
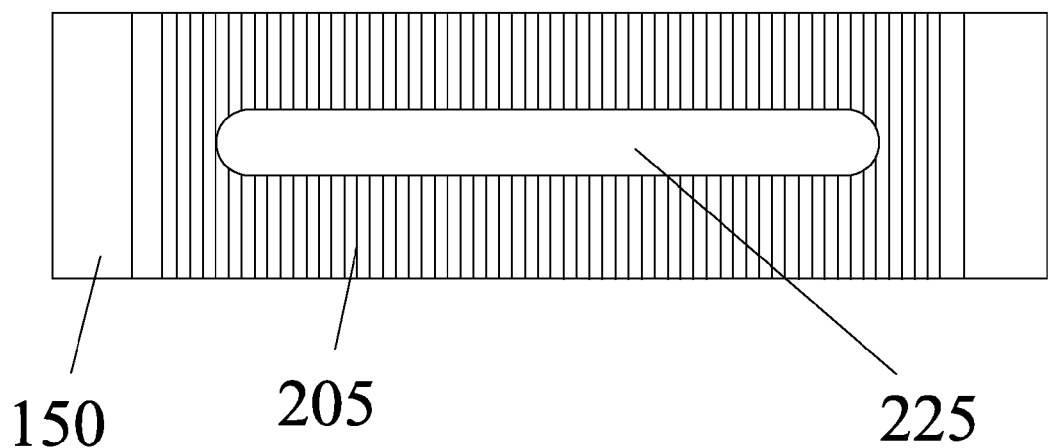
FIG. 8 is a top view of a horizontal clamp portion.
Figure 9:
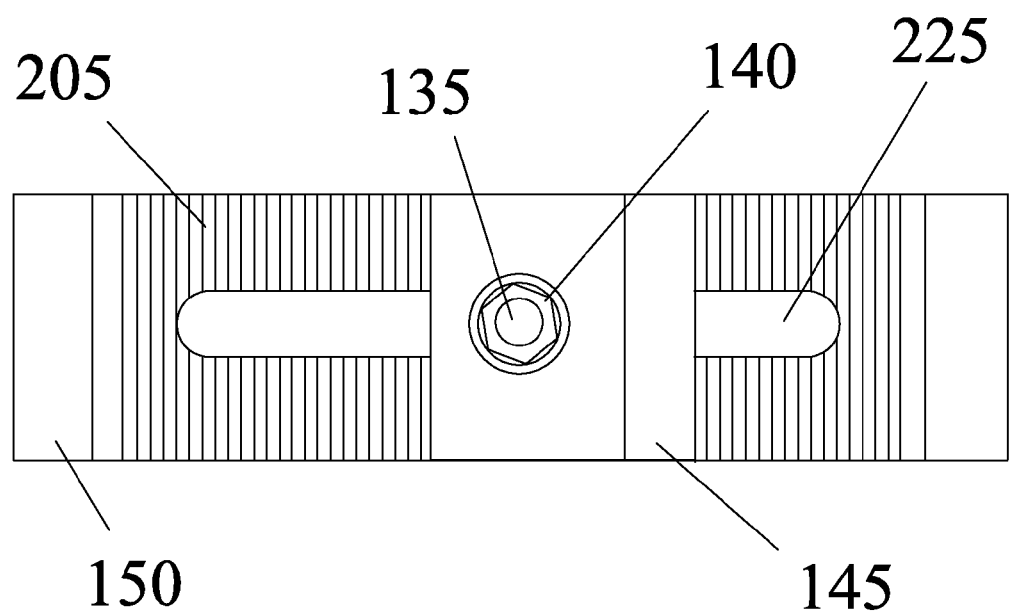
FIG. 9 is a top view of the horizontal clamp portion shown in FIG. 8 along with a vertical clamp portion.
Figure 10:
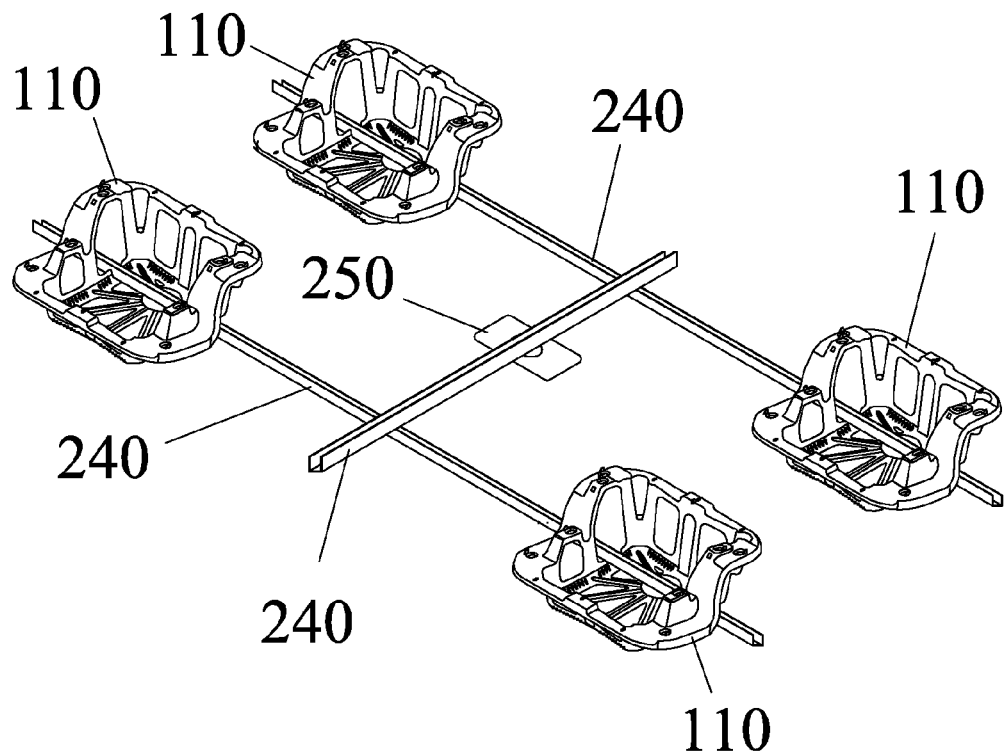
FIG. 10 is a perspective view of a plurality of solar panel mounting bases installed using struts.
Figure 11:
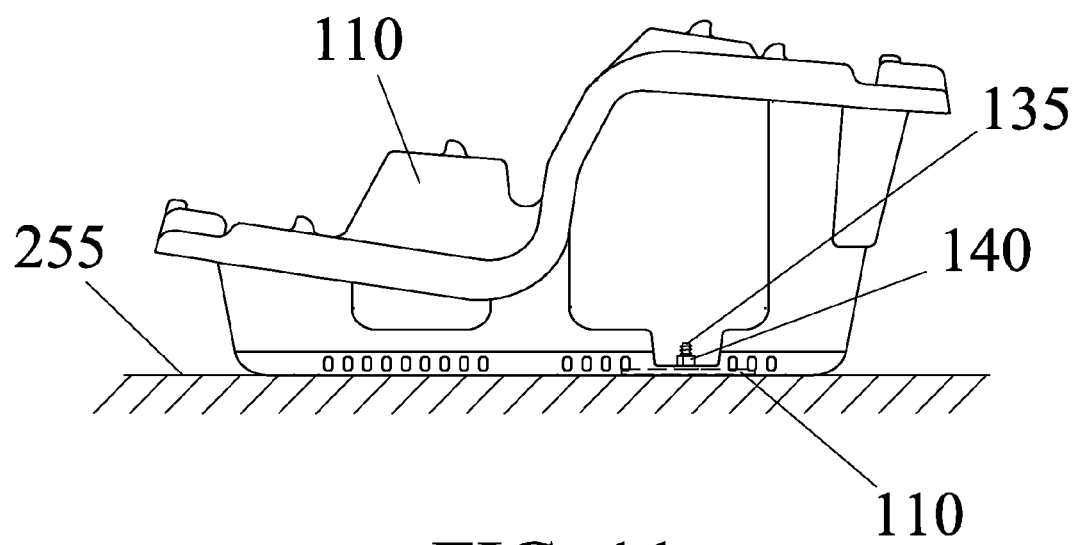
FIG. 11 is a side view of the mounting base shown in FIG. 1 installed using a mechanical anchor.

Now referring to FIG. 11, mounting base 110 is secured to a surface 255 such as a roof where the installation is desired. An anchor plate 260 is attached to surface 255 using bolts, glue, or other fastening devices as known in the art. Anchor plate 260 has carriage bolt 135 that is secured within carriage bolt well 215 like the one shown in FIG. 7A and nut 140 hold down mounting base 110. This installation method works in installations where mechanic anchors can be located beneath bottom attachment point 235.

Referring now to FIGS. 7, 7A, 8 and 9, attachment clamp 125 is shown having a horizontal clamp portion 150 with a series of grooves 205 on an upper surface. An adjustment slot 225 is used to adjust the position of adjustment clamp 125 during installation. In each of the four connection locations 165, 170, 175 and 180, an attachment well 220 is molded within mounting base 110 along with a square shaped carriage bolt well 215. Carriage bolt 135 fits within a metallic square carriage bolt washer 210 and a lower nut 140 is secured within an upper portion of attachment well 220. In this way, carriage bolt 135 is secured to mounting base 110 and allows a vertical clamp portion 145 to be secured with an upper nut 140. Vertical clamp portion 145 has a series of grooves 205 on a bottom portion that interacts with grooves 205 on horizontal clamp portion 150 to securely hold it in a desired position when clamping down solar panel 195. Vertical clamp portion 145 also has a second upper horizontal portion with grooves 206 on its underside to frictionally hold solar panel 195 in place. Alignment tab 130 keeps attachment clamp 125 from rotating when clamping down solar panel 195.

Because mounting base 110 has four different connection locations, the angle that solar panel 195 makes can vary from 5 degrees to 10 degrees depending on the location chosen to mount solar panel 195 to. For example, connecting one edge of solar panel 195 to the lowest connection location on the first mounting base 110 and then connection the opposite edge of solar panel 195 to the highest location on a second mounting base 110 will result in the greatest angle that solar panel 195 is installed at. This eliminates the need to measure and set the angle since the angle is set by the selection of connection locations chosen during the installation. Additionally, the spacing between solar panels 195 mounted in an array varies from 10 inches to 13 inches again depending on which location is chosen. Of course other angles could be provided by changing the height of the locations provided or by providing additional attachment locations (not shown).

Figure 6:
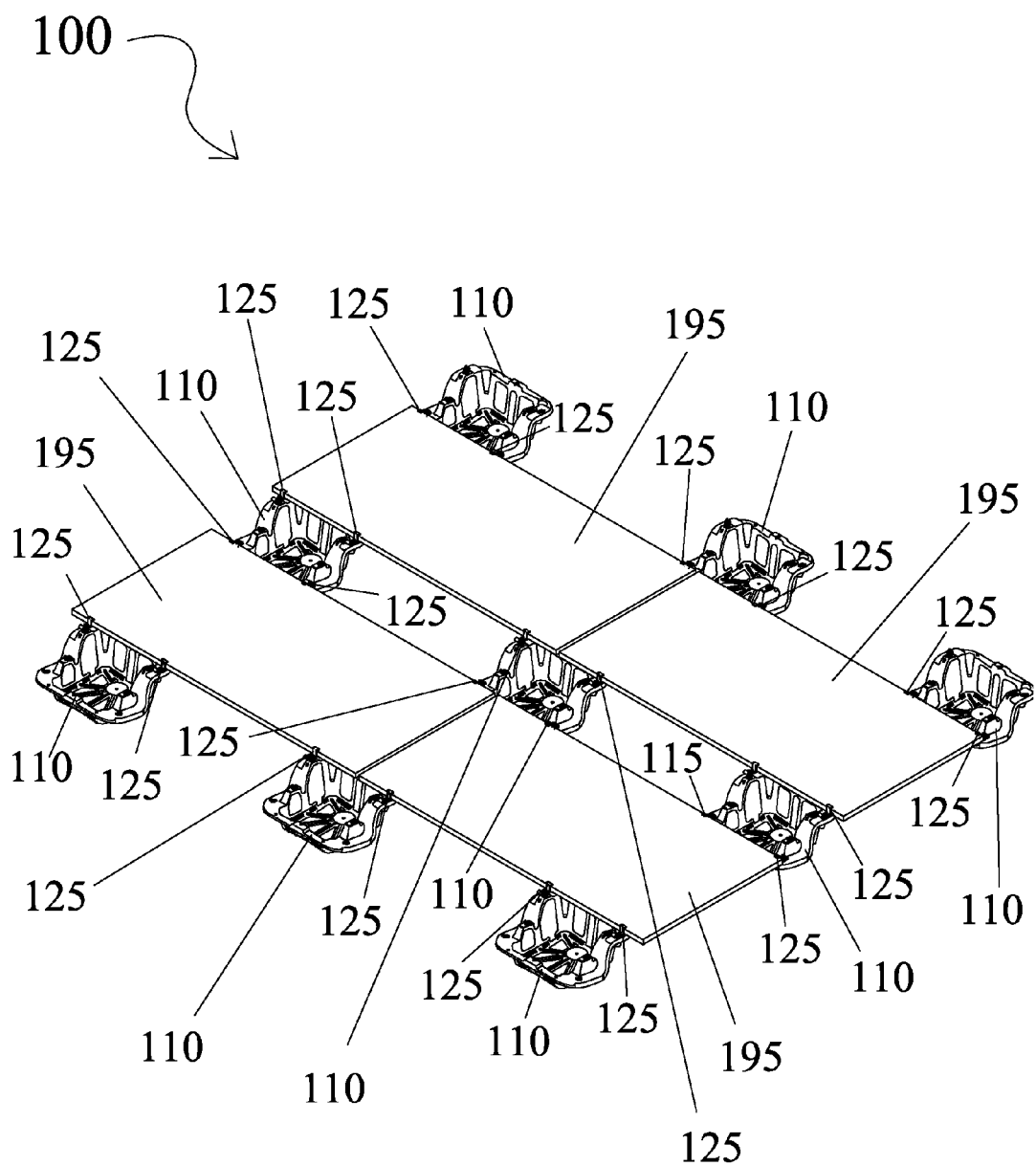
FIG. 6 is a perspective view of a plurality of the solar panel mounting bases shown in FIG. 1 in an array for mounting solar panels.

Referring to FIG. 6, an array of solar panels 195 are installed by placing mounting bases 110 in an array and then attaching solar panels 195 using attachment clamps 125 which are mounted on mounting bases 110. Solar panels are mounted at an angle by attaching them to a selected location on one mounting base 110 to a different location on second mounting base 110.

Although the instant invention has been described in relation to particular embodiments thereof, many other variations and modifications and other uses will become apparent to those skilled in the art.

What is claimed is:

1. A solar panel mounting assembly for mounting solar panels comprising:
   a mounting base having four sides:
   said mounting base having a plurality of connection locations;
   said plurality of connection locations being configured to secure a solar panel at a selected connection location;
   said plurality of connection locations having an upper location pair and a lower location pair;
   each of said connection locations having a mechanical connector wherein said solar panel is secured using said mechanical connector;
   said mounting base having a bottom portion adapted to hold ballast;
   a plurality of hold down notches disposed in said bottom portion of each of said four sides wherein an installation strut is secured therein; and
   said mounting base having sides that narrow from a maximum at a top portion to a minimum at said bottom portion wherein each mounting base is stackable when placed in another mounting base.

2. The solar panel mounting assembly of claim 1 further comprising an alignment tab disposed along a side of said connection location wherein said mechanical connector is aligned when secured to said selected connection location.

3. The solar panel mounting assembly of claim 1 wherein said mechanical connector comprises:
   a horizontal clamp portion having a flat portion;
   said horizontal clamp portion having a plurality of horizontal clamp grooves along an upper surface thereon;
   said horizontal clamp portion having a first end that bends back around defining a generally v-shaped portion with said first end defining an angle of less than 90 degrees with said flat portion and an oppositely disposed second end defining a generally v-shaped portion with said second end defining an angle less than 90 degrees with said flat portion wherein said first end and said second end are angled towards each other;

an adjustment slot disposed in said horizontal clamp portion wherein a bolt adjustably slides therein;

a vertical clamp portion;

said vertical clamp portion having a vertical clamp top portion 90 degrees from said vertical clamp portion and terminating in a top end;

said vertical clamp portion having a vertical clamp bottom portion 90 degrees from said vertical clamp portion and terminating in a bottom end extending in a direction opposite said top end;

said vertical clamp top portion having a plurality of grooves on a bottom surface thereon wherein said top portion frictionally engages with a frame portion of said solar panel; and said vertical clamp bottom portion having a plurality of vertical clamp grooves disposed on a lower surface wherein said plurality of vertical clamp grooves fit within said horizontal clamp grooves wherein said vertical clamp is locked down when said vertical clamp portion is forced against said horizontal clamp portion using a bolt and a nut.

4. The solar panel mounting assembly of claim 1 further comprising a bottom attachment point disposed in said bottom portion of said mounting base wherein a bolt is attached therein to secure said mounting base to a surface.

5. The solar panel mounting assembly of claim 1 further comprising a plurality of drainage channels disposed in said bottom portion of said mounting base wherein water is directed away from said bottom portion.

6. A system for installing solar panels to a surface using a plurality of solar panel mounting assemblies comprising:

a plurality of mounting bases;

each of said plurality of mounting bases having a plurality of connection locations;

said plurality of connection locations being configured to secure a solar panel at a selected connection location;

each of said connection locations having a mechanical connector wherein said solar panel is secured using said mechanical connector;

each mounting base having a bottom portion adapted to hold ballast;

a plurality of hold down notches disposed in said bottom portion therein;

said mounting base having sides that narrow as from a maximum at a top portion to a minimum at said bottom portion wherein each mounting base is stackable when placed in another mounting base;

at least one solar panel having a leading edge and a trailing edge;

said leading edge secured using said mechanical connector at a selected connection location on a pair of mounting bases disposed thereon; and said trailing edge secured at a second selected connection location disposed on a second pair of mounting bases wherein said solar panel is securely held in place.

7. The system for installing solar panels to a surface using a plurality of solar panel mounting assemblies according to claim 6 wherein each of said mounting bases is secured to said surface using ballast disposed therein.

8. The system for installing solar panels to a surface using a plurality of solar panel mounting assemblies according to claim 6 wherein each of said mounting bases is secured to said surface using mechanical connectors.

* * * * *